(12) United States Patent
Mohanty et al.

(10) Patent No.: US 12,306,845 B2
(45) Date of Patent: May 20, 2025

(54) ARTIFICIAL INTELLIGENCE DRIVEN KNOWLEDGE GRAPH GENERATION

(71) Applicant: Pienomial Inc., Rockville, MD (US)

(72) Inventors: Sanat Mohanty, Rockville, MD (US); Omkar Krishnat Patil, Kolhapur (IN)

(73) Assignee: Pienomial Inc., Rockville, MD (US)

( * ) Notice: Subject to any disclaimer, the term of this patent is extended or adjusted under 35 U.S.C. 154(b) by 0 days.

(21) Appl. No.: 18/764,446

(22) Filed: Jul. 5, 2024

(65) Prior Publication Data
US 2025/0013655 A1    Jan. 9, 2025

(51) Int. Cl.
*G06F 16/248* (2019.01)
*G06F 16/25* (2019.01)

(52) U.S. Cl.
CPC .......... *G06F 16/248* (2019.01); *G06F 16/258* (2019.01)

(58) Field of Classification Search
CPC .............................. G06F 16/248; G06F 16/258
See application file for complete search history.

(56) References Cited

U.S. PATENT DOCUMENTS

2023/0394232 A1* 12/2023 Shin .................. G06F 40/40

* cited by examiner

*Primary Examiner* — Truong V Vo
(74) *Attorney, Agent, or Firm* — Novo TechIP International PLLC

(57) ABSTRACT

A data processing system implements accessing content items from a plurality of data sources, generating a knowledge graph by analyzing each of the content items with a language model to obtain embedding vectors representing each first content items, receiving a query and an indication of a format for results of the query from a first client device, generating query embeddings for the query using the first language model, searching the knowledge graph based on the query embeddings to obtain the results of the query, generating a representation of the results of the query according to the indication of the format for the results of the query, and causing the first client device to present the representation of the results of the query on a user interface of the first client device.

20 Claims, 12 Drawing Sheets

ARTIFICIAL INTELLIGENCE DRIVEN KNOWLEDGE GRAPH GENERATION

BACKGROUND

The pharmaceutical and medical device spaces are broad spaces that include multiple domains of knowledge. These domains of knowledge are often non-overlapping. Experts in one therapeutic area often do not have knowledge of developments in other therapeutic areas. For example, an expert in diabetes may not be aware of new developments related to cancer that may be of interest. Similarly, researchers within a particular domain of knowledge may become siloed and may not be aware of developments outside of their area of expertise. For example, an expert in skin cancers may be unaware of developments in blood cancers that may be of interest. The pharmaceutical and medical device spaces also include various functional domains, including but not limited to disease understanding, discovery, translational research, clinical and regulatory sciences, business development, and market access and pricing. These functional domains often do not have access to information knowledge that may be of interest from other functional domains. The separation of these various domains within the pharmaceutical and medical device spaces can negatively impact the discovery and development of drugs and/or medical devices as well as the development of programs in various disease areas. Hence, there is a need for improved systems and methods of automating the acquisition and assessment of data for discovering, analyzing, and sharing data across the various domains of the pharmaceutical and/or medical device spaces.

SUMMARY

An example data processing system according to the disclosure may include a processor and a machine-readable medium storing executable instructions. The instructions when executed cause the processor alone or in combination with other processors to perform operations including accessing content items from a plurality of data sources associated with pharmaceutical development, medical device development, or both; generating a knowledge graph by analyzing each of the content items with a first language model to obtain embedding vectors representing each first content items, the embedding vectors representing one or more categories of information associated with each of the content items; receiving a query and an indication of a format for results of the query from a first client device, the query identifying one or more categories of information to search for using the knowledge graph, and the indication of the format for the results of the query indicates a format in which results of the query are to be presented; generating query embeddings for the query using the first language model; searching the knowledge graph based on the query embeddings to obtain the results of the query; generating a representation of the results of the query according to the indication of the format for the results of the query; and causing the first client device to present the representation of the results of the query on a user interface of the first client device.

An example method implemented in a data processing system for analyzing content items includes accessing content items from a plurality of data sources associated with pharmaceutical development, medical device development, or both; generating a knowledge graph by analyzing each of the content items with a first language model to obtain embedding vectors representing each first content items, the embedding vectors representing one or more categories of information associated with each of the content items; receiving a query and an indication of a format for results of the query from a first client device, the query identifying one or more categories of information to search for using the knowledge graph, and the indication of the format for the results of the query indicates a format in which results of the query are to be presented; generating query embeddings for the query using the first language model; searching the knowledge graph based on the query embeddings to obtain the results of the query; generating a representation of the results of the query according to the indication of the format for the results of the query; and causing the first client device to present the representation of the results of the query on a user interface of the first client device.

An example data processing system according to the disclosure may include a processor and a machine-readable medium storing executable instructions. The instructions when executed cause the processor alone or in combination with other processors to perform operations including obtaining, using a data access unit, known biomedical entity information for a plurality of known biomedical entities, the known biomedical entities comprising one or more of disease information, biomarker information, or mechanisms of action information; selecting, using the data access unit, information for a first biomedical entity from among the plurality of known biomedical entities as a first query parameter; querying, using the data access unit, content items from one or more data sources associated with pharmaceutical development, medical device development, or both; compressing, using the data compression unit, the first query parameter and the each of the content items using a first compression algorithm to create compressed content entries; analyzing, a candidate entity selection unit, the compressed content entries to select candidate content entries to be added to a knowledge graph; constructing, using a graph construction unit, the knowledge graph using the candidate content entries; and validating, using a graph validation unit, the knowledge graph to identify and remove discrepancies from the knowledge graph.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
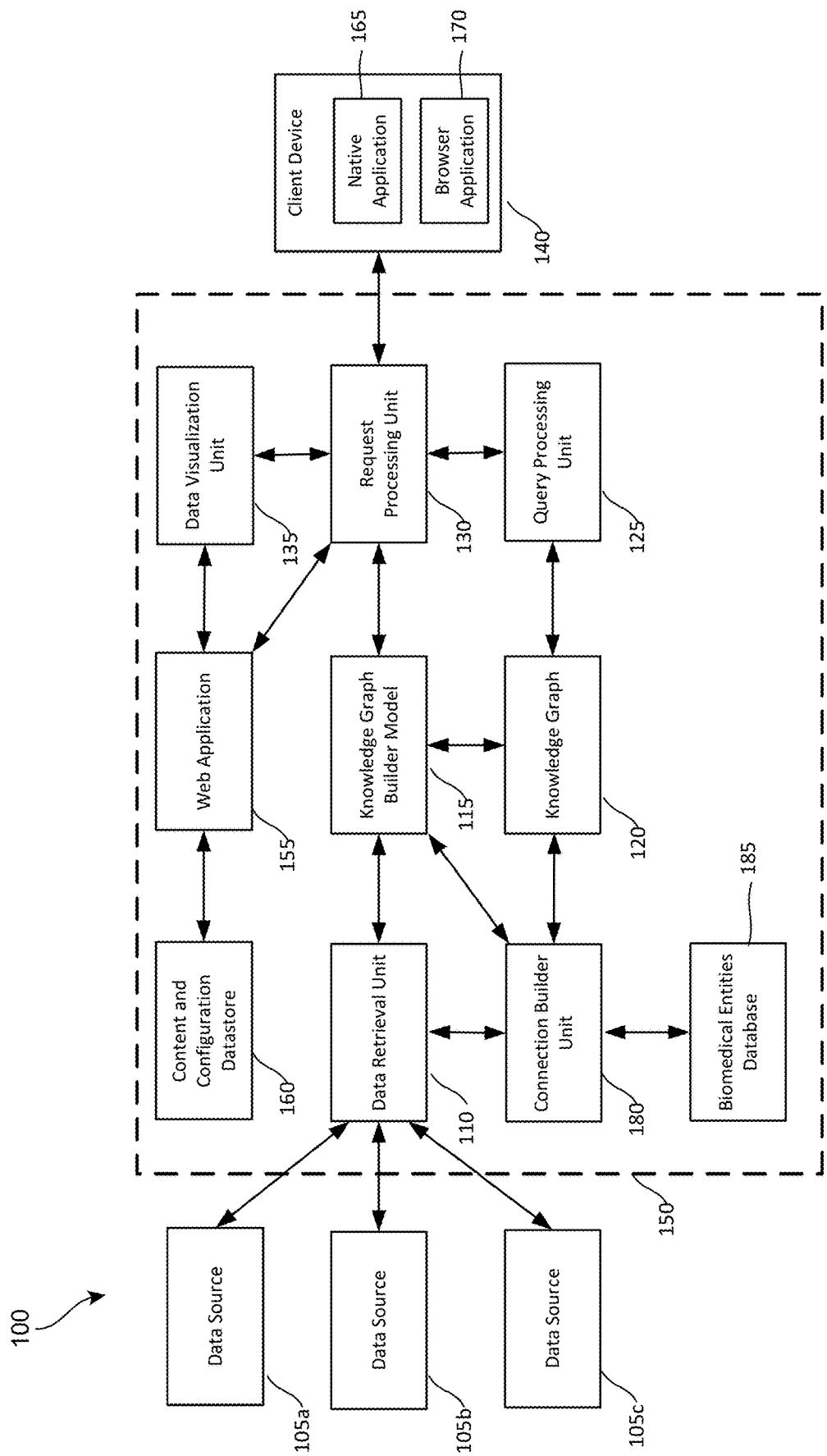
FIG. 1A is a diagram showing an example computing environment in which the techniques disclosed herein may be implemented.

Techniques for artificial intelligence (AI) driven knowledge graph generation are provided. These techniques provide a technical solution to the problem of accurately acquiring, assessing, comparing, and analyzing large volumes of data across the various domains of the pharmaceutical and/or medical device spaces in a timely and efficient manner. These techniques are used to implement an information analysis and decision support platform (IADSP) that is configured to automatically perform these tasks. The IADSP builds a knowledge graph based on content items from numerous data sources and to facilitate searching for and analyzing relevant content based on the contents of the knowledge graph. The knowledge graph provides a semantic representation of the content item that describes the content items and the relationships between the content items in which the content items are represented as nodes and edges between the nodes represent relationships between content items. A technical benefit of this approach is that such searches automate what was previously a laborious and time-intensive process of manually querying multiple data sources for potentially relevant content items and analyzing those items. The IADSP automates this process and can significantly reduce the timescale for performing such search and analysis. Search and analysis tasks which formerly took months to accomplish can be completed in a matter of minutes or less using the techniques provided herein.

The knowledge graph is generated using an encoder transformer algorithm to create vector embeddings from content items from numerous public and/or private data sources to generate vector embeddings representing each of these content items. The encoder transformer algorithm is implemented using the encoder or encoders of one or more encoder-decoder type machine learning models. The data sources may include but are not limited to press releases, news articles, documents submitted to regulatory agencies, both domestically and internationally, journal articles and/or other publications, abstracts of publications, published patent applications and issued patents, both domestic and international, financial filings, analyst call transcripts, press releases, and/or other types of documents that can provide valuable cross-domain knowledge to various users within the pharmaceutical or medical device spaces.

The machine learning models are implemented using Large Language Models (LLMs) in some implementations. Other implementations utilize Small Language Models (SLMs). Yet, other implementations utilize a combination of LLMs and SLMs as discussed in the examples which follow. The vector embeddings output by the models are vectors of numerical values that represent the content of each of the content items. The embeddings map each of the content items into an embedding space based on these numerical values. A technical benefit of this approach is that proximity within the embedding space implies semantic similarity between two content items. These vector embeddings are used to implement the knowledge graph. The knowledge graph can be used to link together various content items that are semantically related and may be relevant to each other within the pharmaceutical and/or medical spaces. The IADSP leverages the knowledge graph to rapidly identify relevant content items from among the vast number of content items available in the data sources by implementing a vector search on the knowledge graph. A technical benefit of this approach is that a vector search can yield more relevant results and executes faster than a keyword search. Using a conventional keyword search is a slow and unwieldy process and would take a significant amount of time to search all of the data sources utilized by the IADSP for relevant content and would utilize significantly more computer resources than the techniques provided herein.

The knowledge graph includes connection information identifying connections between content items and known ontological biomedical entities that facilitate rapid identification and analysis of content items included in the knowledge graph. To implement these connections, the embeddings to be included in the knowledge graph are compared with a database of known ontological biomedical entities to create a shortlist of known ontological biomedical entities. The ontological biomedical entities represent related concepts or categories that may be discussed in the content items that have been incorporated into the knowledge graph. These relationships can be used to identify potentially relevant content items in the knowledge graph that can be used to generate a response to a natural language query. The shortlist of known biomedical entities is created using a vector search algorithm that compares the embedding vectors of the content item with embeddings associated with the known ontological biomedical entities. The shortlist is then verified to ensure that the entries included in the list are actually included in the content item using a confidence score matrix to generate a final confidence score for each entry in the shortlist. A connection between the content item and the known ontological biomedical entity is added to the knowledge graph in response to the final confidence score indicating that the content item includes a reference to the ontological biomedical entity. A technical benefit of this approach is that encoder-only models are used to perform the analysis, which provides more accurate results than current approaches that utilize decoder-only models to extract information from content items. The primary function of decoder-only models is the generation of new textual content. The decoder-only models tend to hallucinate and create biomedical entities which are not present in the ontological database, thereby rendering any content generated based on this content to be incorrect. Consequently, the techniques provided herein can provide significantly more reliable results.

The knowledge graph utilized by the IADSP is not static and continues to evolve as the data sources and the content items associated with these data sources change. The vector embeddings are updated as new data sources are added, new content items are added to existing data sources, and/or content items are updated for existing data sources. A technical benefit of this approach is that the knowledge graph is continually kept up to date to provide users with content items that represent the current state of the pharmaceutical and/or medical device spaces. Current manual search techniques can easily miss relevant content items that are added or modified after the user has already searched a particular data source.

Another technical benefit of the techniques provided herein is that the vector embeddings representing a content item and information indicating a source from which the content item may be obtained are stored by the IADSP, but the content items themselves do not need to be stored by the IADSP. This approach can significantly reduce the computing resources associated with implementing the techniques herein compared with storing each of the content items themselves. In some implementations, the system processes millions of content items and storing such a large volume of content items would require significant computing and storage resources to manage the content items.

The IADSP utilizes the knowledge graph to implement various software modules that query the knowledge graph and provide visualizations of the results obtained from the knowledge graph and/or generates other types of content based on the query results. The IADSP converts the query parameters to vector embeddings and compares with the vector embeddings of the content items included in the knowledge graph using a vector search as discussed above. Consequently, the user does not need to perform the laborious and time-consuming manual process of formulating queries to multiple data sources in an attempt to retrieve relevant data. The techniques herein provide significant cost savings, time savings, and labor savings compared with the current manual and labor-intensive techniques of obtaining and analyzing such information. The techniques provided herein may be used to acquire and analyze data in minutes that would have previously taken a team of analysts hundreds of hours to complete using the current manual and labor-intensive techniques.

Another technical benefit of the knowledge graph the knowledge graph provides traceability for the results generated based on the data included in the knowledge graph. The visualizations and/or other content generated using the information of the knowledge graph include citations to the source documents from which the model or models derived the information presented in the visualization or other content. LLMs and other such models can hallucinate results that are not grounded in reality when prompted for information that was not included in their training data. Such hallucinations are unacceptable for generating content that users would rely on within the pharmaceutical and/or medical device spaces, because these decisions not only can have life or death consequences for patients who may be treated using the pharmaceuticals or medical devices being developed but also have a massive financial impact on the pharmaceutical and/or medical device development should a particular pharmaceutical or medical device under development not be effective. A technical benefit of the approach described in the present application is that all content generated using the techniques herein can be traced back to the source content item to ensure that the content is grounded. These and other technical benefits of the techniques disclosed herein will be evident from the discussion of the example implementations that follow.

FIG. 1A is a diagram showing an example computing environment 100 in which the techniques for automatically, accurately, and rapidly acquiring, assessing, comparing, and analyzing the large volumes of data associated with data across the various domains of the pharmaceutical and/or medical device spaces can be implemented. The computing environment 100 includes an IADSP 150, data sources 105a, 105b, and 105c (collectively referred to as data source 105 herein), and client device 140. The IADSP 150 includes data retrieval unit 110, knowledge graph builder model 115, knowledge graph 120, query processing unit 125, request processing unit 130, and data visualization unit 135.

The IADSP 150 provides real time insights, trends, and recommendations to professionals in the biopharmaceutical and/or medical device industry according to the techniques provided herein. The IADSP 150 is implemented as a set of cloud-based services in some implementations, and the IADSP 150 communicates with the data sources 105a-105c and the client device 140 via a network. The network may be a dedicated private network, a public network, and/or the combination of public and private networks commonly referred to as the Internet. Additional details of the data retrieval unit 110, knowledge graph builder model 115, knowledge graph 120, query processing unit 125, request processing unit 130, and data visualization unit 135 of the IADSP 150 are described in detail in the examples which follow.

The data sources 105a, 105b, and 105c may provide electronic copies of various types of content, including but not limited to press releases, news articles, documents submitted to regulatory agencies both domestically and internationally, journal articles and/or other publications, abstracts of publications, published patent applications and issued patents both domestic and international, financial filings, analyst call transcripts, press releases, and/or other types of documents that may provide valuable cross-domain knowledge to various users within the pharmaceutical or medical device space. The data sources 105a, 105b, and 105c may include free data sources, subscription data sources, or a combination thereof. Whereas the example implementation shown in FIG. 1A includes three data sources, other implementations may include a different number of data sources.

The content items provided by the data sources 105a-105c include structured and/or unstructured documents. Structured documents, as used herein, refer to a document that includes some method of markup to identify elements of the document as having a specified meaning. The structured documents may be available in various domain-specific schemas, such as but not limited to Journal Article Tag Suite (JATS) for describing scientific literature published online, Text Encoding Initiative (TEI), and Extensible Markup Language (XML). Unstructured documents, also referred to as "free form" documents herein, are documents that do not include such markup to identify the components of the documents.

The data retrieval unit 110 obtains content items from the data sources 105a-105c and provides the content items to the knowledge graph builder model 115 for analysis. The data retrieval unit automatically accesses the data sources 105a-105c to check for new content items that have not yet been processed by the IADSP 150 and/or content items that have been updated since they were last processed by the IADSP 150. In some implementations, the data retrieval unit 110 is configured to periodically check each of the data sources 105a-105c for new content or updates. The IADSP 150 provides a user interface for an administrator to configure the frequency at which the data retrieval unit 110 performs these checks. Some data sources 105 may have new content added or content added more frequently than other data sources. Therefore, the IADSP 150 enables the administrator to select a frequency at which the data retrieval unit 110 checks for new content items and/or updated content items from each data source 105. The administrator can also specify a default frequency at which the data retrieval unit 110 checks with each data source 105 to determine whether any new content items have been added or existing content items have been updated.

The data retrieval unit 110 is configured to analyze content items that include structured and/or unstructured documents. The data retrieval unit 110 is configured to extract data from the various content items and to convert the data to a standardized format or schema for processing by the knowledge graph builder model 115. A technical benefit of this approach is that the LLM or SLM models can be trained on data having this standardized format or schema, which can improve the inferences made by the models when analyzing data in this standardized format or schema. Consequently, the models can provide more consistent results when analyzing the content items obtained from the data sources 105 by the data retrieval unit 110.

The knowledge graph builder model 115 receives content items from the data retrieval unit 110 that either have not yet been processed by the IADSP 150 or have been updated since the content item was last processed. The knowledge graph builder model 115 is an LLM or SLM that uses an encoder-decoder architecture. The encoder of the knowledge graph builder model 115 is used to generate embedding vectors that represent each of the content items. In some implementations, the knowledge graph builder model 115 implements a bidirectional encoder representation from transformers algorithm to generate the embeddings. The embedding vectors generated by the knowledge graph builder model 115 are used to create the knowledge graph 120. A technical benefit of the knowledge graph builder model is that the model may be implemented by a smaller LLM or SLM that requires significantly fewer computing resources to implement than the larger LLM. Consequently, the resources required to analyze the large volume of data provided by the data sources 105 can be significantly reduced by using smaller LLM or SLM to generate the vector embeddings without significantly impacting the performance of the model. The knowledge graph 120 is based on embedding vectors representing the content items that have been encoded by the knowledge graph builder model 115. The vector embeddings facilitates searching the vast amount of content items from the data sources 105 that have been analyzed by the knowledge graph builder model 115.

The knowledge graph 120 also includes connection information that identifies connections between content items included in the knowledge graph and known ontological biomedical entities from the biomedical entities database 185. The known biomedical entities are a curated list of biomedical entities may include but not limited to diseases, biomarkers, mechanisms of action, and/or other biomedical entities that may be relevant to the development of pharmaceuticals and/or medical devices. The connections facilitate rapid identification and analysis of content items included in the knowledge graph when generating content based on the knowledge graph. To implement these connections, the connection builder unit 180 compares the embeddings included in the knowledge graph 120 for a particular content item with the biomedical entities included in the database 185 to create a shortlist of known ontological biomedical entities. The ontological biomedical entities represent concepts or categories of information that may be discussed in the content items that have been incorporated into the knowledge graph 120. These relationships can be used to identify potentially relevant content items in the knowledge graph that can be used to generate a response to a natural language query. The connection builder unit 180 creates the shortlist of known biomedical entities using a vector search algorithm that compares the embedding vectors of the content item with embeddings associated with the known ontological biomedical entities. The connection builder unit 180 then performs a relevance check on the shortlist of candidate biomedical entities to ensure that the biomedical entities included in the shortlist are actually included in the content item. The connection builder unit 180 uses a confidence score matrix to make the determination whether the biomedical entries from the shortlist are included in the content item. The shortlist is then verified to ensure that the entries included in the list are actually included in the content item using a confidence score matrix to generate a final confidence score for each entry in the shortlist. The connection builder unit 180 adds a connection between the content item and the known ontological biomedical entity to the knowledge graph in response to the final confidence score indicating that the content item includes a reference to the ontological biomedical entity. A technical benefit of this approach is that encoder-only models are used for this process. Current approaches for extracting information from content items utilize decoder-only models. The primary purpose of such decoder-only models is the generation of new textual content, which can result in hallucinations in which the model creates biomedical entities which are not present in the ontological database, thereby rendering any content generated based on this content to be incorrect. The encoder-only approach taken by the techniques provided herein cannot result in such hallucinations. Consequently, the techniques provided herein can provide significantly more reliable results.

The knowledge graph 120 can also include additional information, such as but not limited to content item source information that is used to enable visualization and/or other content generated by the IADSP 150 to be traced back to the source content items to ensure that the content is grounded. As will be discussed in the examples that follow, the various user interfaces provided by the IADSP 150 provide the user with the ability to view the source content item information and/or obtain copies of the content items. The knowledge graph 120 is stored in a persistent datastore of the IADSP 150 and can be accessed and/or updated by the components of the IADSP 150 discussed herein. The knowledge graph 120 can be leveraged to generate visualizations and/or other content based on known relationships between certain categories of data encoded by the models. The knowledge graph builder model 115 is trained to recognize certain categories of information in the content items in some implementations to facilitate linking content items that have been included in the knowledge graph 120. In a non-limiting example, one category of information is categories of diseases, and another category of information is the biomarkers associated with these diseases that are detected when a therapy is working or when a therapy is not working. Other categories of information may be the companies or other organizations that are involved in testing pharmaceuticals for these categories of diseases and/or for specific mechanisms of actions. The model or models used to generate the knowledge graph 120 are trained to recognize these and other categories of information that are relevant to pharmaceutical and/or medical device development and to include this information in the embeddings associated with the content items where applicable. A technical benefit of this approach is that the relationships between the various relevant categories of information can be quickly explored in the knowledge graph 120 to automatically generate visualizations and/or other content that would have otherwise required labor-intensive manual queries to numerous data sources and subsequent analysis of the data obtained to attempt to identify relevant information. For complex problems, the gathering and analysis of such information may take days or even months. The IADSP 150 facilitates generation of this information in a matter of minutes or less. Consequently, the resources that would have been directed to the manual gathering and analysis of this information can be directed to other productive endeavors.

The request processing unit 130 receives queries from the client device 140. The client device 140 includes a native application in some implementations that provides a user interface for formulating queries to present to the IADSP 150 to obtain visualizations and/or other content generated based on information obtained by querying the knowledge graph 120. The query from the user may be presented as a natural language prompt in some implementations. The natural language prompt includes an indication of the type of data to be obtained from the knowledge graph 120 and an indication as to how the data is to be presented to the user. The request processing unit 130 provides the natural language query to the knowledge graph builder model 115 in some implementations, and the knowledge graph builder model 115 generates vector embeddings for the query. The request processing unit 130 provides the query embeddings to the query processing unit 125 to search the knowledge graph 120 for relevant data. The query processing unit 125 utilizes a vector search to search for relevant results based on the query in some implementations. The results obtained from the query processing unit 125 are provided to the data visualization unit 135 with the indication as to how the data is to be presented to the user. The connection information identified by the connection builder unit 180 may also be used to identify potentially relevant results by identifying one or more biomedical entities in the query and searching for content items included in the knowledge graph that are associated with those biomedical entities.

The data visualization unit 135 receives the data obtained from the query processing unit 125 and formats the data according to the indication as to how the data is to be presented to the user. The data may be presented to the user as various types of graphs, charts, tables, and/or text. In some implementations, the data visualization unit 135 generates a document that includes the query results in the requested format. In other implementations, the data visualization unit 135 generates web-based content that is accessible from the client device 140 via a web-enabled native application or web browser. Additional details and examples of how queries are processed, and the rendering of the results are generated and presented on the client device 140 are provided in the examples which follow.

The client device 140 is a computing device that may be implemented as a portable electronic device, such as a mobile phone, a tablet computer, a laptop computer, a portable digital assistant device, and/or other such devices. The client device 140 may also be implemented in computing devices having other form factors, such as a desktop computer and/or other types of computing devices. While the example implementation illustrated in FIG. 1A includes a single client device, other implementations may include a different number of client devices that may utilize the services provided by the IADSP 150. Furthermore, in some implementations, some features of the services provided by the IADSP 150 may be implemented by a native application installed on the client device 140, and the native application may communicate with the data sources 105a, 105b, and 105c and/or the IADSP 150 over a network connection to exchange data with the data sources 105a, 105b, and 105c, and/or to access features implemented on the data sources 105a, 105b, and 105c and/or the IADSP 150. In some implementations, the client device 140 may include a native application that is configured to communicate with the IADSP 150 to provide visualization and/or reporting functionality.

The IADSP 150 implements a web application 155 in some implementation that can be accessed by a web-enabled native application 165 or web browser 170 on the client device 140. The web application provides the user interface 205 in such implementations and the user interface is presented to the user in the web browser 170 or native application 165 on the client device 140. In other implementations, the client device 140 includes a native application that renders the user interface 205 and the native application obtains the data to populate the user interface 205 from the IADSP 150.

The IADSP 150 also includes a content and configuration datastore 160. The content and configuration datastore 160 is a persistent datastore that is used by the IADSP 150 to store configuration data, user interface layout information and content for the web application 155, content and layout information used by the data visualization unit 135, and/or other content or configuration information that may be used by the various components of the IADSP 150.

Figure 1B:
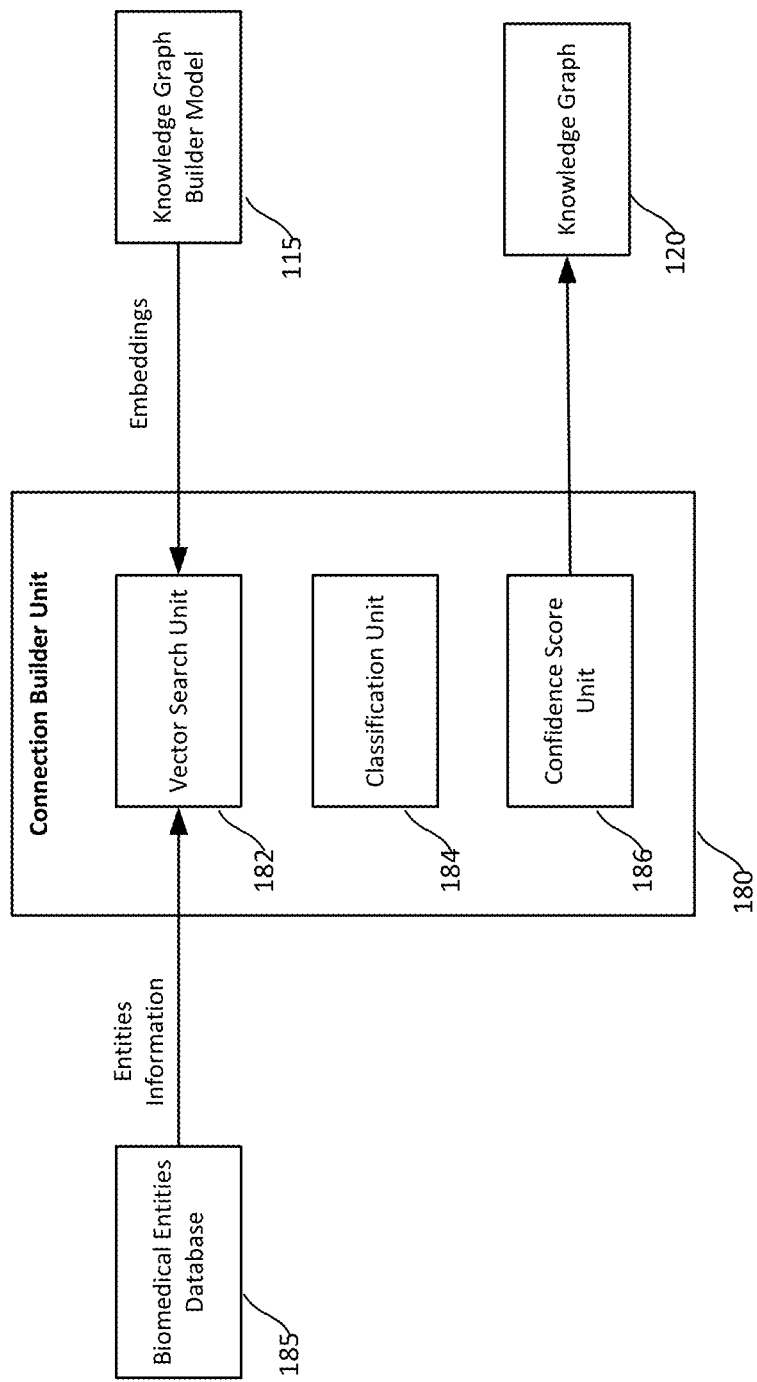
FIG. 1B is a diagram showing additional details of the connection builder unit shown in FIG. 1A.

FIG. 1B is a diagram showing additional details of the connection builder unit 180 shown in FIG. 1A. The connection builder unit 180 includes a vector search unit 182, a classification unit 184, and a confidence score unit 186. The vector search unit 182 performs a vector search on the biomedical entities database 185 which contains information for known biomedical entities. The known biomedical entities represent related concepts or categories that may be discussed in the content items that have been incorporated into the knowledge graph. These relationships can be used to identify potentially relevant content items in the knowledge graph that can be used to generate a response to a natural language query. These queries may be received from a user conducting research or may be used to implement a module that utilizes data from the knowledge graph 120.

The vector search unit 182 receives embeddings vectors from the knowledge graph builder model 115 and conducts a search for known biomedical entities in the biomedical entities database 185. The vector search unit 182 conducts this search using a vector search algorithm to identify potentially matching known biomedical entities based on the similarity of the embeddings associated with the content items received from the knowledge graph builder model 115 and the embeddings associated with the known biomedical entities in the biomedical entities database 185. The vector search unit 182 generates a shortlist of known biomedical entities for each content item.

The classification unit 184 analyzes the shortlist of known biomedical entities for each content item. The classification unit 184 includes an encoder neural network configured to classify whether the potentially matching biomedical entities included in the shortlist identified by the vector search module are actually present in the text of the content item. The classification unit concatenates the text of the content item and the potential matching biomedical entities from the shortlist. In some implementations, the classification unit 184 a multi-layer perceptron encoder neural network.

The confidence score unit 186 determines a final confidence score for each of the potentially matching biomedical entities from the shortlist. The final confidence score for a respective potentially matching biomedical entity indicating whether the text of the content item includes a reference to the respective potentially matching biomedical entity. If the final confidence score for the respective potentially matching biomedical entity satisfies a predetermined threshold, the connection builder unit 180 adds a connection between the biomedical entity and the content item. This process is repeated for each of the candidate biomedical entities included in the shortlist.

The confidence score unit 186 implements a confidence score matrix to make the determination whether the biomedical entries from the shortlist are included in the content item. The confidence score matrix generates a final confidence score for each potentially matching biomedical entity by combining: (1) the similarity score generated by the vector search algorithm for the content item and the potentially matching biomedical entity, and (2) an output from a last layer of the encoder neural network of the classification unit 184. A technical benefit of this approach is that the models used are encoder-based and avoid the problem of hallucination of biomedical entities not included in the biomedical entities database 185.

Figure 1C:
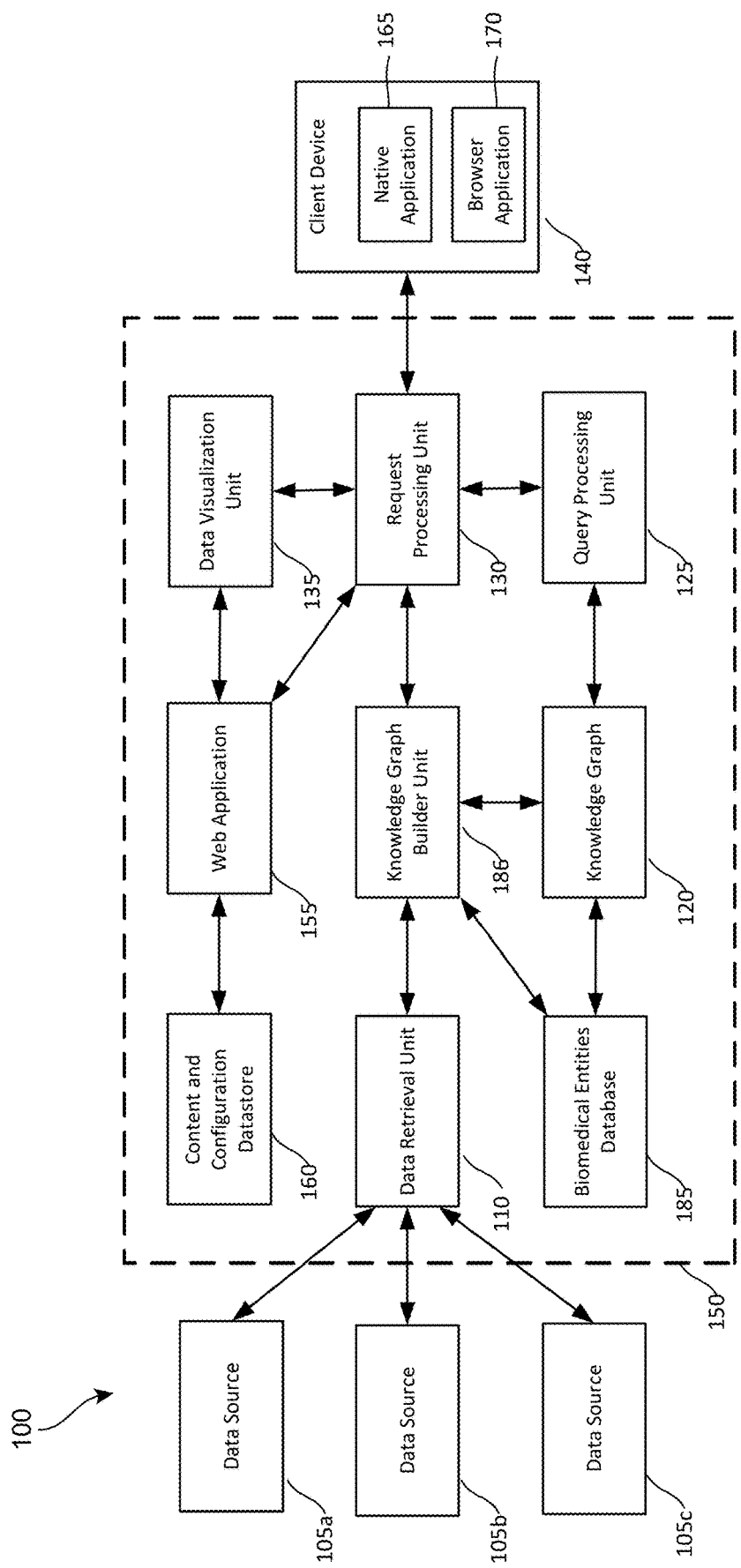
FIG. 1C is a diagram showing an alternate example implementation of the computing environment shown in FIG. 1A.

FIG. 1C is a diagram showing an alternate example implementation of the computing environment 100 shown in FIG. 1A. The implementation of the computing environment 100 shown in FIG. 1C includes a knowledge graph builder unit 195 that constructs the knowledge graph instead of the approach using the knowledge graph builder model 115 and the connection builder unit 180 shown in FIG. 1A. The knowledge graph builder unit 195 queries the data sources, such as the data sources 105a-105c, selects candidate biomedical entities to include in the knowledge graph 120, constructs the knowledge graph 120, verifies the contents of the knowledge graph 120 to identify discrepancies, and revises the knowledge graph 120 to correct the identified discrepancies if necessary. An example implementation of the knowledge graph builder unit 195 is shown in FIG. 1D.

Figure 1D:
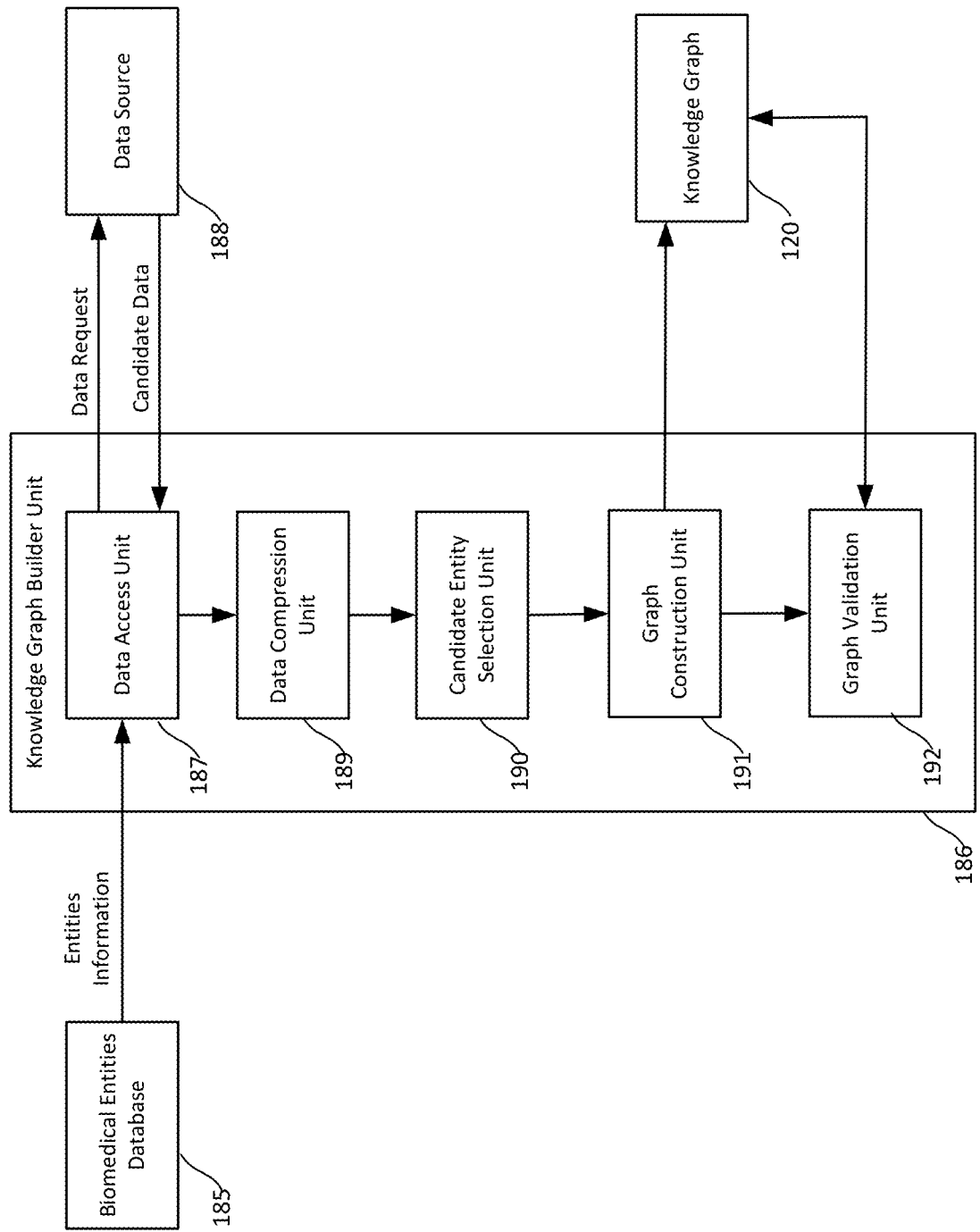
FIG. 1D is a diagram showing an example implementation of the knowledge graph builder unit shown in FIG. 1C.

FIG. 1D is a diagram showing an example implementation of the knowledge graph builder unit 186. The knowledge graph builder unit 186 includes a data access unit 187, a data compression unit 189, a candidate entity selection unit 190, a graph construction unit 191, and a graph validation unit 192.

The data access unit 187 obtains at least a portion of the content items included in a data source 188 that may be included in the construction of the knowledge graph 120. In the example show in FIG. 1D, the data access unit 187 send a data request to the data source 188 for a set of candidate data to be analyzed by the knowledge graph builder unit 195. Large data sources may be processed in blocks of data. The data source 188 may be a data source, such as the data sources 105a-105c discussed in FIGS. 1A and 1C. In the example implementation shown in FIG. 1D, the knowledge graph builder unit 186 is shown querying a single data source. However, the data access unit 187 may query multiple data sources, such as the data sources 105a-105c. The data access unit constructs and executes queries on the data sources in which the query parameters are based on the entities information from the biomedical entities database 185. As discussed in the preceding examples, the biomedical entities represent related concepts or categories that may be discussed in the content items obtained from various data sources. The data access unit 187 constructs queries in which the query parameters are selected from the known biomedical entities and executes the queries on the various data sources in an attempt obtain content items that are relevant to those particular known biomedical entities. These candidate content items are then further analyzed by the knowledge graph builder unit 186 to determine the semantic relationship between these: candidate content items and the known biomedical entities and to use this semantic information to construct the knowledge graph 120.

The data compression unit 189 compresses query parameters and the content items obtained by the data access unit 187 to prepare the query parameters and the content items for analysis. In a non-limiting example, the query parameters for a query are for a known biomedical entity referred to as "Disease A" and the candidate content items retrieved by the data access unit are believed to be associated with this disease but are further analyzed to determine whether there is a semantic relationship between the disease and these content items before the content items are added to the knowledge graph 120. The data compression unit compresses the query parameters and each of the content items retrieved using those query parameters to generate compressed content entries. In some implementations, the data compression unit 189 utilizes a combination of lossy compression algorithms. These lossy compression algorithms can include bigram and/or trigram frequency analysis. In other implementations, the data compression unit 189 utilizes lossless compression algorithms, such as but not limited to Lempel-Ziv-Welch (LZW) encoding. Regardless of the compress technique utilized, the data compression unit 189 outputs compressed content entries. The data compression unit 189 outputs multiple compressed content entries, each representing a respective content item, when the query returns multiple content items. The compressed content entries include a query parameter and content item compressed entry comprising the query parameter and the content item compressed together, a query parameter compressed entry comprising just the query parameter, and a content item compressed entry comprising just the content item.

The candidate entity selection unit 190 analyzes the compressed content entries generated by the data compression unit 189 to select candidates to be used be added to the knowledge graph 120. For each compressed entry, the candidate entity selection unit 190 determines a normalized compression distance between the query parameter and content item compressed entry and the query parameter compressed entry and the content item compressed entry. A smaller distance is indicative of a greater semantic similarity between the query parameter and the content item, while a greater distance is indicative of a lesser semantic similarity between the query parameter and the content item. The candidate entity selection unit 190 applies a predetermined threshold to the normalized compression distances to identify candidates to be analyzed for possible addition to the knowledge graph 120. The threshold distance can be selected such that the candidate entities are considered to be semantically related enough to be associated in the knowledge graph 120. The candidate entity selection unit 190 adds the compressed content entries that satisfy the threshold to a list of candidates to be considered for addition to the knowledge graph 120. For each candidate from the list of candidates, the candidate entity selection unit 190 concatenates the query parameter with the content item to generate a concatenated input. The candidate entity selection unit 190 provides the concatenated input as an input to an encoder-based neural network classifier to determine a match validity indication and to produce a match confidence score for the query. The match validity indication indicates whether the query parameter matches semantically with the content item and the confidence score provides an indication as to how strongly the model associates the match validity indication with the concatenated input. A higher confidence score indicates a higher semantic relationship between the query parameter and the content item.

The graph construction unit 191 updates the knowledge graph 120 based on confidence scores determined by the candidate entity selection unit 190. The graph construction unit 191 adds an edge the knowledge graph 120 representing the relationship between the candidate biomedical entity represented by the query parameter and the content item, which are represented by respective nodes.

The graph validation unit 192 analyzes the knowledge graph 120 after the graph construction unit 191 generates the knowledge graph 120. The graph validation unit 192 analyzes the knowledge graph 120 using a transformer-based algorithm to identify discrepancies in the associations between the biomedical entities and the content items represented by the edges of the knowledge graph 120. The transformer-based algorithm compares the biomedical entity and the content item to output a prediction whether the relationship between the biomedical entity and the content item determined by the graph construction unit 191 appears to be accurate. If the transformer-based algorithm detects a discrepancy between the relationship between the biomedical entity and the content item determined by the graph construction unit 191 and the relationship between the biomedical entity and the content item determined by the transformer-based algorithm, the graph validation unit 192 to correct the discrepancy.

Figure 2:
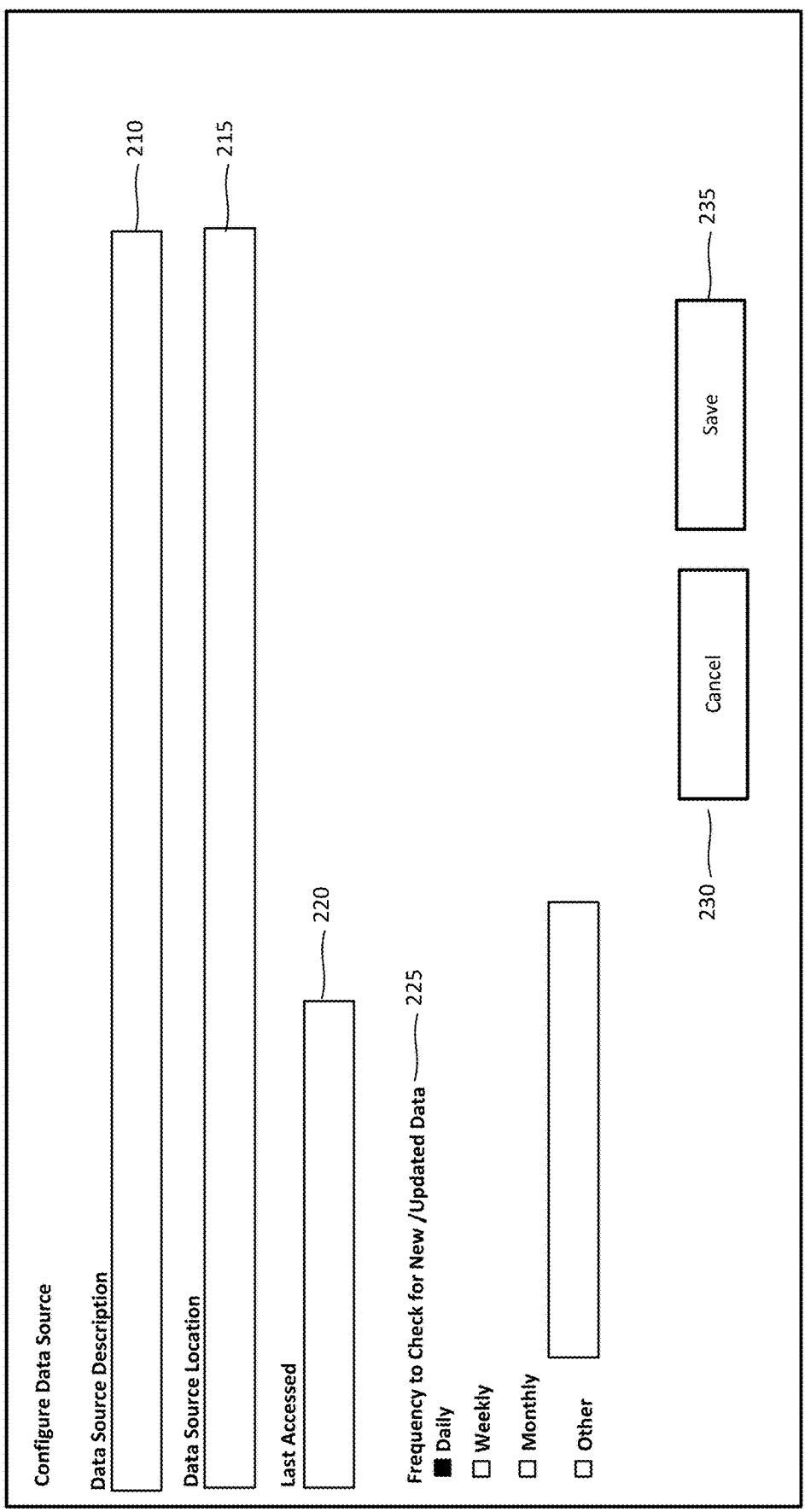
FIG. 2 is a diagram of an example user interface for configuring a data source according to the techniques disclosed herein.

FIG. 2 is a diagram of an example user interface 205 for configuring a data source 105 according to the techniques disclosed herein. The user interface 205 is implemented by the web application 155 of the IADSP 150 in some implementations, and the content provided by the web application 155 is accessed by the web-enabled native application 165 or the web browser 170 on the client device.

The user interface 205 includes a data source description field 210 that enables an administrator adding or modifying a data source 105 to provide a description of the data source 105. The user interface 205 includes a data source location field 215. The data source location field 215 can be used to enter a Uniform Resource Locator (URL), a network address, or other location information that indicates where the data source 105 is located. Some implementations include authentication credential information, such as but not limited to a username and password pair, that permit the IADSP 150 to access information stored by the data source 105. The user interface 205 includes a last access field 220, in some implementations, that provides a read-only indication of when the IADSP 150 last checked whether the data source 105 includes new or modified content items to be analyzed by the IADSP 150. The user interface 205 also includes a frequency control setting that allows the administrator to select how often to check the data source 105 for new or updated content items. The IADSP 150 stores the information obtained via the user interface 205 in the content and configuration datastore 160. The data retrieval unit 110 accesses the content and configuration datastore 160 to determine which data sources 105 to search and how frequently to search to search the data sources 105 for new content items and/or updated content items.

Figure 3A:
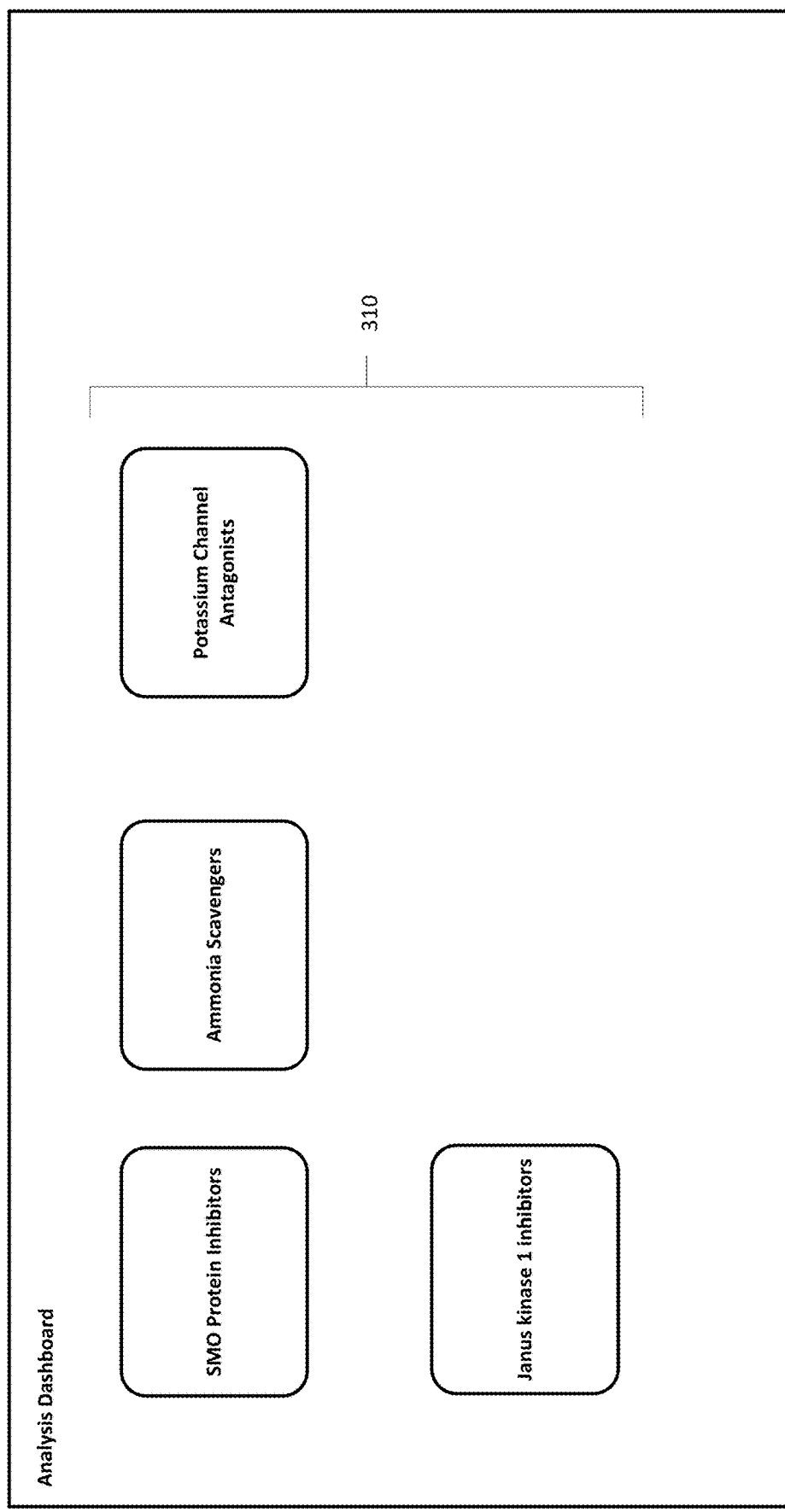
FIG. 3A-3C are diagrams of an example user interface of a module that utilizes the data from the knowledge graph to provide analysis and reporting.

FIG. 3A is a diagram of an example user interface 305 that presents a set of modules 310 that utilize the knowledge graph to provide various types of visualizations of specified sets of data, to generate content based on the knowledge graph 120, and/or provide other types of analytical and/or reporting functions using the data included in the knowledge graph 120. In some implementations, the modules 310 are implemented by the web application 155 of the IADSP 150 and are accessible by the web-enabled native application 165 and the web browser 170 of the client device 140. In other implementations, the modules 310 are implemented by the native application 165 of the client device 140, and the native application 165. The user interface 305 shows four modules in the example implementation shown in FIG. 3A. However, in other implementations the user may have access to a different number of modules which are presented to the user on the user interface 305. In some implementations, the user interface 305 includes controls for searching for particular modules and/or filtering the modules which are displayed, which can help the user to locate a particular module of interest. In some implementations, access to the modules is purchased through a subscription service, and the modules may be offered individually or in bundles.

The user may click on or otherwise activate the representation of one of the modules 310 to cause the module to be executed. The module is configured to automatically send a request to the request processing unit 130 of the IADSP 150 to provide one or more queries to the query processing unit 125 to obtain the data for the module from the knowledge graph 120. The request processing unit 130 provides the data to the data visualization unit 135 to generate the representations of the data to be presented by the module. As discussed in the preceding examples, the data visualization unit 135 can generate various types of graphical visualizations of the data, such as but not limited charts, graphs, and tables. The data visualization unit 135 can generate textual content based on the data obtained the data objected from the knowledge graph. In some implementations, the knowledge graph 120 is used to identify which documents are relevant for the analysis to be performed for the module and the documents are obtained from their respective data sources 105 and analyzed. In other implementations, relevant data for the module is stored in and obtained from the knowledge graph 120. The visualizations presented by the module are dynamic in some implementations and allow the user to interact with the visualization to customize the view of the data to suit their needs. Some non-limiting examples of such interactions include providing the user with the ability to zoom in or out on a graph or chart, to adjust one or more filter parameters on the visualization to allow the user to narrow or broaden the scope of the data included in the presentation, and/or adjust other such parameters of the visualization. As discussed in the preceding examples, the visualization may also include controls that cause the source information associated with each of the content items from which the visualization is derived to be displayed. Similar controls may be provided for textual content generated by the data visualization unit 135. The data visualization unit 135 can generate reports, summaries, papers, presentations, and other textual content in some implementations. The module can provide the user with controls for configuring various parameters for the content to be included. The textual content may be presented a dynamic or static electronic form. A dynamic form is suitable for web-based content that may be accessed and interacted with by a user consuming the content. Static content may be suitable for electronic publications in which the content is read by the user consuming the content but does not include interactive elements. Furthermore, the data visualization unit 135 may provide interactive or static visualizations of the content data that may be incorporated into the dynamic or static textual content.

Figure 3B:
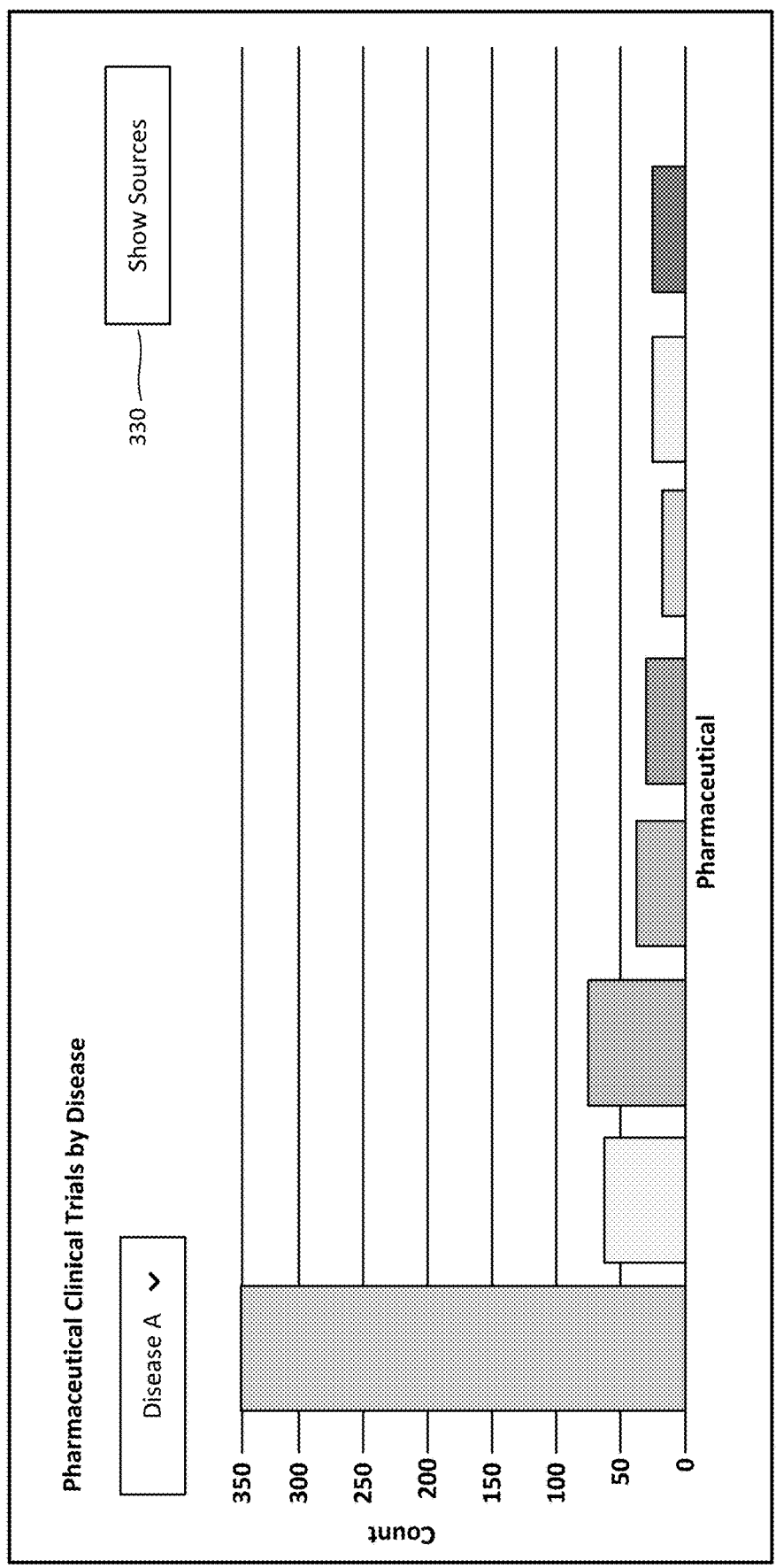
Figure 3C:
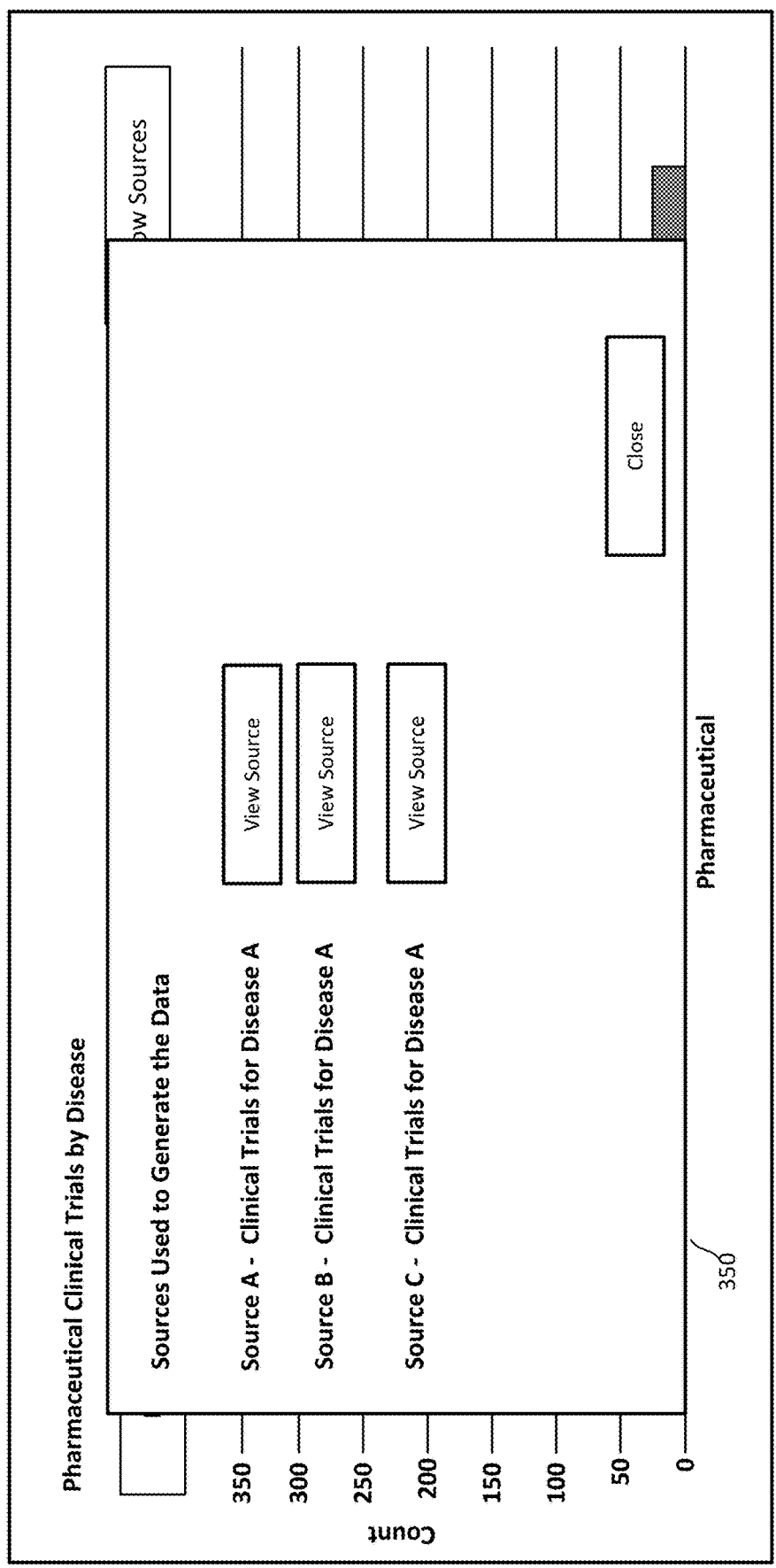

FIG. 3B is a diagram of a user interface 320 of an example module that may be implemented according to the techniques provided herein. The user interface 320 in this non-limiting example includes a bar chart that the user may click on or otherwise interact with to obtain additional information about the data included in each of the bars of the chart and/or may change other parameters of the chart to cause the visualization to be dynamically updated. The user interface 320 includes a show sources control 330 that may be clicked on or otherwise activated by the user to cause the source information to be displayed for the content items used to generate the content presented by the module. FIG. 3C shows an example source information pane 350 that includes example source information that provides grounding for the content presented by the module. The source information pane 350 also provides controls, which when activated, cause the content item to be presented to the user. The request processing unit 130 can request that the data retrieval unit 110 obtain a copy of the content item from the data source 105 from which the content item was originally obtained and analyzed for inclusion in the knowledge graph 120. A technical benefit of this approach is that the user can readily access grounding information that verifies that the content presented by the model is accurate according to the original source documentation and has not been hallucinated by the language model.

Figure 4A:
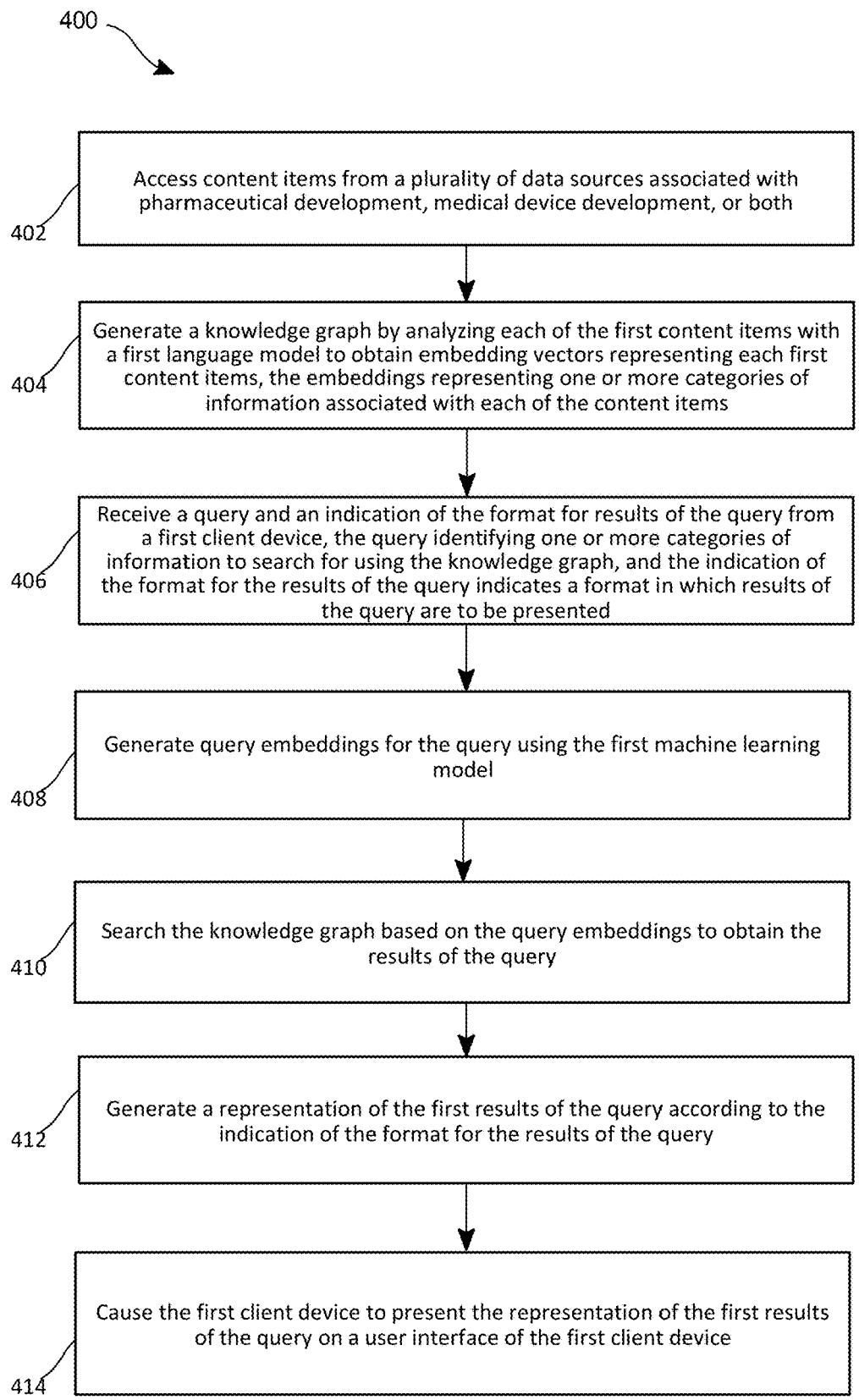
FIG. 4A is a flow chart of an example process for generating content using a knowledge graph.

FIG. 4A is a flow chart of an example process 400 for generating and utilizing a knowledge graph, such as the knowledge graph 120. The process 400 is implemented by the IADSP 150 in some implementations. The process 400 implements the techniques for acquiring and analyzing clinical trial information described herein.

The process 400 includes an operation 402 of accessing content items from a plurality of data sources 105 associated with pharmaceutical development, medical device development, or both. As discussed in the preceding examples, the data retrieval unit 110 of the IADSP 150 is configured to access content items of the data sources 105.

The process 400 includes an operation 404 of generating a knowledge graph 120 by analyzing each of the content items with a first language model to obtain embedding vectors representing each first content items. The embeddings represent one or more categories of information associated with each of the content items. The knowledge graph builder model 115 generates the vector embeddings representing each of the content items. The embeddings form the knowledge graph 120.

The process 400 includes an operation 406 of receiving a query and an indication of a format for results of the query from a first client device 140. The query identifies one or more categories of information to search for using the knowledge graph, and the indication of the format for the results of the query indicates a format in which results of the query are to be presented. The client device 140 provides the query and the indication of the format for the results of the query. In some implementations, the client device 140 includes a native application that is a web-enabled application that provides a user interface for users to utilize the services provided by the IADSP 150. The native application sends the query to the IADSP with an indication for the format for the results. The request processing unit 130 receives the query and provides the query to the query processing unit 125 to be executed.

The process 400 includes an operation 408 of generating query embeddings for the query using the first language model. The request processing unit 130 provides the query as an input to the knowledge graph builder model 115 so that the query is encoded using the same encoder that was used to encode the content items from the data sources 105.

The process 400 includes an operation 410 of searching the knowledge graph 120 based on the query embeddings to obtain the results of the query. The query processing unit 125 searches the knowledge graph 120 to identify relevant content items from the data sources 105 that have been encoded and included in the knowledge graph 120.

The process 400 includes an operation 412 of generating a representation of the results of the query according to the indication of the format for the results of the query. The data visualization unit 135 generates the representation of the first results of the first query.

The process 400 includes an operation 414 of causing the first client device to present the representation of the results of the query on a user interface of the first client device 140. The request processing unit 130 causes the client device 140 to present the visualization or other content generated by the data visualization unit 135.

Figure 4B:
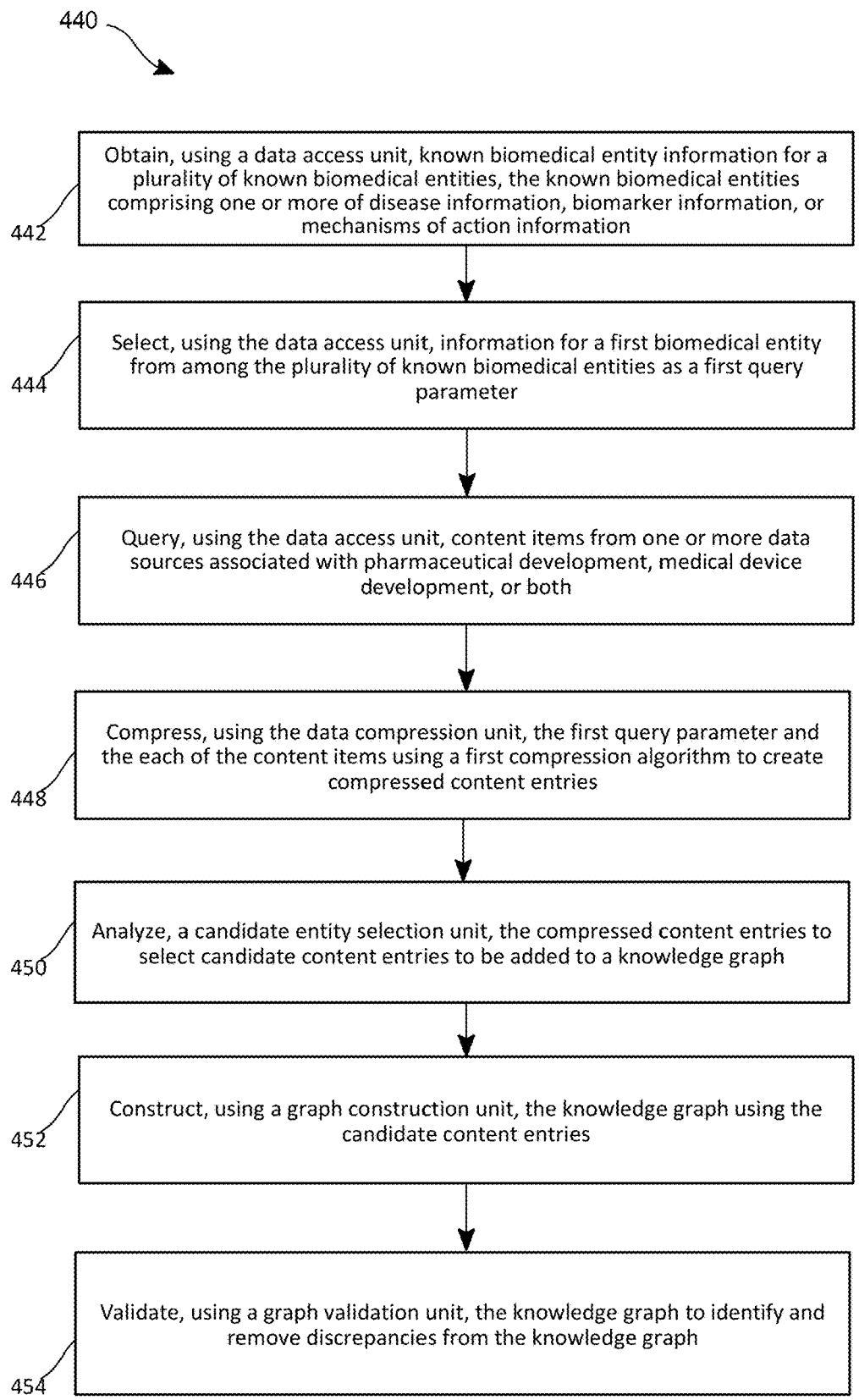
FIG. 4B is a flow chart of an example process for generating a knowledge graph according to the techniques herein.

FIG. 4B is a flow chart of an example process 440 for generating a knowledge graph, such as the knowledge graph 120. The process 440 is implemented by the IADSP 150 shown in FIG. 1C and/or the knowledge graph builder unit 186 shown in FIG. 1D in some implementations.

The process 400 includes an operation 442 of obtaining, using a data access unit 187, known biomedical entity information for a plurality of known biomedical entities, the known biomedical entities comprising one or more of disease information, biomarker information, or mechanisms of action information. The data access unit 187 accesses the biomedical entities database 185 to obtain the known biomedical entity information in some implementations.

The process 400 includes an operation 444 of selecting, using the data access unit 187, information for a first biomedical entity from among the plurality of known biomedical entities as a first query parameter and an operation 446 of querying, using the data access unit 187, content items from one or more data sources associated with pharmaceutical development, medical device development, or both. The data access unit 187 can formulate a query or each of the biomedical entities in the biomedical entities database. The data access unit 187 can construct queries individually for each of the known biomedical entities so that the content items retrieved are related to a specific biomedical entity.

The process 400 includes an operation 448 of compressing, using the data compression unit 189, the first query parameter and the each of the content items using a first compression algorithm to create compressed content entries. The query parameters and content items are compressed to facilitate semantic analysis by a transformer model as discussed in the preceding examples to identify content items that actually have a semantic relationship with the known biomedical entity for which the query was performed.

The process 400 includes an operation 450 of analyzing, a candidate entity selection unit 190, the compressed content entries to select candidate content entries to be added to a knowledge graph.

The process 400 includes an operation 452 of constructing, using a graph construction unit 191, the knowledge graph 120 using the candidate content entries. As discussed in the preceding examples, the knowledge graph includes content items and known biomedical entities as nodes and the edges represent semantic relationships between these content items and the known biomedical entities. Once the knowledge graph 120 has been constructed, these relationships can be leveraged to search for content items that are associated with user-specified known biomedical entities.

The process 400 includes an operation 454 of validating, using a graph validation unit 192, the knowledge graph 120 to identify and remove discrepancies from the knowledge graph 120. As discussed in the preceding examples, the graph validation unit 192 identifies discrepancies in the knowledge graph 120 in which the semantic relations suggested by the candidate entity selection unit 190 were incorrect. The graph validation unit 192 identifies such discrepancies and removes these semantic links from the knowledge graph 120.

The detailed examples of systems, devices, and techniques described in connection with FIGS. 1-4B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-4 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 5:
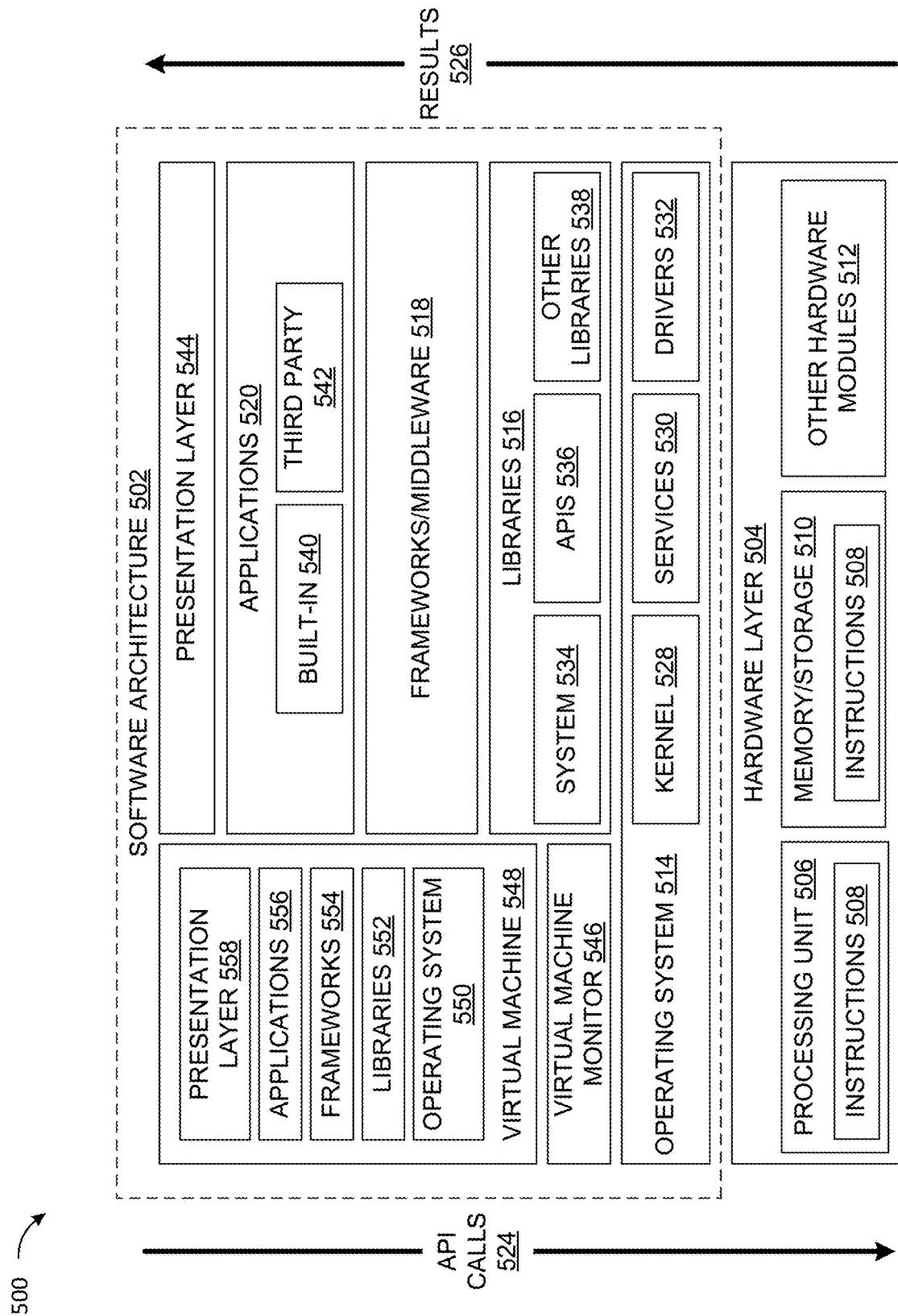
FIG. 5 is a block diagram showing an example software architecture, various portions of which may be used in conjunction with various hardware architectures herein described, which may implement any of the described features.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 and associated executable instructions 508. The executable instructions 508 represent executable instructions of the software architecture 502, including implementation of the methods, modules and so forth described herein. The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks/middleware 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The f frameworks/middleware 518 provide a higher-level common infrastructure that may be used by the applications 520 and/or other software modules. For example, the frameworks/middleware 518 may provide various graphic user interface (GUI) functions, high-level resource management, or high-level location services. The frameworks/middleware 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular platform. The applications 520 may use functions available via OS 514, libraries 516, frameworks/middleware 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
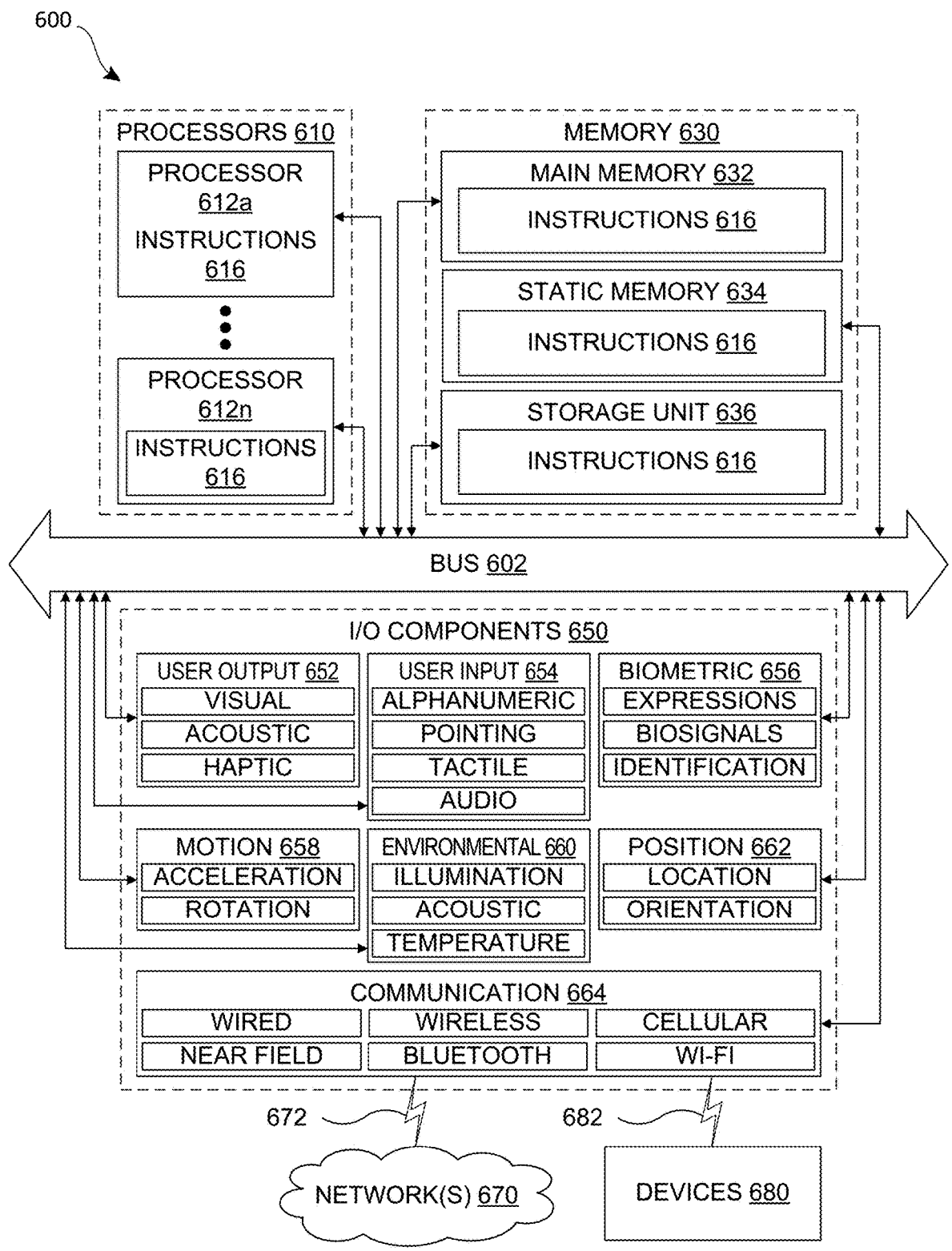
FIG. 6 is a block diagram showing components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement modules or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660, and/or position components 662, among a wide array of other physical sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 658 may include, for example, acceleration sensors (for example, an accelerometer) and rotation sensors (for example, a gyroscope). The environmental components 660 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable medium storing executable instructions that, when executed, cause the processor alone or in combination with other processors to perform operations comprising:
   accessing content items from a plurality of data sources associated with pharmaceutical development, medical device development, or both;
   generating a knowledge graph by analyzing each of the content items with a first language model to obtain embedding vectors representing each first content items, the embedding vectors representing one or more categories of information associated with each of the content items;
   receiving a query and an indication of a format for results of the query from a first client device, the query identifying one or more categories of information to search for using the knowledge graph, and the indication of the format for the results of the query indicating a format in which results of the query are to be presented;
   generating query embeddings for the query using the first language model;
   searching the knowledge graph based on the query embeddings to obtain the results of the query;
   generating a representation of the results of the query according to the indication of the format for the results of the query; and
   causing the first client device to present the representation of the results of the query on a user interface of the first client device.

2. The data processing system of claim 1, wherein the content items include one or more of press releases, news articles, documents submitted to regulatory agencies both domestically and internationally, journal articles and/or other publications, abstracts of publications, published patent applications and issued patents, financial filings, and analyst call transcripts.

3. The data processing system of claim 1, wherein the first language model is a Large Language Model (LLM) or Small Language Model (SLM), the first language model having an encoder-decoder architecture.

4. The data processing system of claim 1, wherein the representation of the results of the query comprises a graphical representation of results of the query providing a visualization of the results of the query.

5. The data processing system of claim 1, wherein searching the knowledge graph based on the query embeddings to obtain the results of the query comprises searching the knowledge graph using a vector search.

6. The data processing system of claim 1, wherein the machine-readable medium includes instructions configured to cause the processor alone or in combination with other processors to perform operations of, prior to generating the knowledge graph, extracting information from the content items and converting the information to a standard format used to train the first language model.

7. The data processing system of claim 1, wherein the machine-readable medium includes instructions configured to cause the processor alone or in combination with other processors to perform operations of:
automatically checking the plurality of data sources for new content items, updated content items, or both; and
automatically updating the knowledge graph by analyzing the new content items, the updated content items, or both using the first language model.

8. The data processing system of claim 7, wherein the machine-readable medium includes instructions configured to cause the processor alone or in combination with other processors to perform operations of:
causing the first client device to present a source configuration user interface that includes a control for configuring a frequency at which the automatic checks for a selected data source of the plurality of data sources is checked for new content items, updated content items, or both;
receiving an indication of a first frequency from the first client device; and
automatically checking the selected data source for new content items, updated content items, or both according to the first frequency.

9. The data processing system of claim 1, wherein the generating the knowledge graph includes associating each content item with content item source information that provides an indication of the data source from the plurality of data sources from which the content item can be obtained.

10. The data processing system of claim 1, wherein the representation of the results of the query include controls, which when activated, cause the client device to present content source information associated with each of the content items from which the representation is derived.

11. The data processing system of claim 1, wherein generating the knowledge graph further comprises generating connection information indicating connections between the content items and known biomedical entities.

12. The data processing system of claim 11, wherein generating the connection information further comprises:
generating a final confidence score by combining a similarity score associated with a first content item and a first known biomedical entity generating by a vector search algorithm and with an output of a last neural layer of the vector search algorithm; and
creating a connection between the first content item and the first known biomedical entity in response to the final confidence score indicating that a confidence score matrix indicating that the first content item includes a reference to the first known biomedical entity.

13. A method implemented in a data processing system for analyzing content items, the method comprising:
accessing content items from a plurality of data sources associated with pharmaceutical development, medical device development, or both;
generating a knowledge graph by analyzing each of the content items with a first language model to obtain embedding vectors representing each first content items, the embedding vectors representing one or more categories of information associated with each of the content items;
receiving a query and an indication of a format for results of the query from a first client device, the query identifying one or more categories of information to search for using the knowledge graph, and the indication of the format for the results of the query indicates a format in which results of the query are to be presented;
generating query embeddings for the query using the first language model;
searching the knowledge graph based on the query embeddings to obtain the results of the query;
generating a representation of the results of the query according to the indication of the format for the results of the query; and
causing the first client device to present the representation of the results of the query on a user interface of the first client device.

14. The method of claim 13, wherein the content items include one or more of press releases, news articles, documents submitted to regulatory agencies both domestically and internationally, journal articles and/or other publications, abstracts of publications, published patent applications and issued patents, financial filings, and analyst call transcripts.

15. A data processing system comprising:
a processor; and
a machine-readable medium storing executable instructions that, when executed, cause the processor alone or in combination with other processors to perform operations comprising:
obtaining, using a data access unit, known biomedical entity information for a plurality of known biomedical entities, the known biomedical entities comprising one or more of disease information, biomarker information, or mechanisms of action information;
selecting, using the data access unit, information for a first biomedical entity from among the plurality of known biomedical entities as a first query parameter;
querying, using the data access unit, content items from one or more data sources associated with pharmaceutical development, medical device development, or both;
compressing, using the data compression unit, the first query parameter and the each of the content items using a first compression algorithm to create compressed content entries;
analyzing, a candidate entity selection unit, the compressed content entries to select candidate content entries to be added to a knowledge graph;
constructing, using a graph construction unit, the knowledge graph using the candidate content entries; and validating, using a graph validation unit, the knowledge graph to identify and remove discrepancies from the knowledge graph.

16. The data processing system of claim 15, wherein the biomedical entity information includes one or more of disease information, biomarker information, or mechanisms of action information.

17. The data processing system of claim 15, wherein the first compression algorithm is one of a lossless compression algorithm or a lossy compression algorithm.

18. The data processing system of claim 15, wherein compressing the first query parameter and the each of the content items using the first compression algorithm to create compressed content entries further comprises:
   compressing the first query parameter and a first content item using the first compression algorithm to create a parameter and content item compressed entry;
   compressing the first query parameter using the first compression algorithm to create a query parameter compressed entry;
   compressing the first content item using the first compression algorithm to create a content item compressed entry.

19. The data processing system of claim 18, wherein analyzing the compressed content entries to select candidate content entries further comprises:
   determining a normalized compression distances between the query and parameter content item and the query parameter compressed entry and between the query and parameter content item and the content item compressed entry;
   selecting the first content item as a candidate content entry responsive to the normalized compression distances satisfying a predetermined threshold; and
   analyzing the candidate content entries with a encoder-based neural network to determine whether each of the candidate content entries are valid matches.

20. The data processing system of claim 15, wherein validating the knowledge graph to identify and remove discrepancies from the knowledge graph further comprises:
   analyzing the knowledge graph using a transformer-based algorithm to identify discrepancies in associations between biomedical entities and content items in the knowledge graph.

\* \* \* \* \*